Dec. 13, 1966  J. L. VAILL ETAL  3,290,914
METHOD AND APPARATUS FOR FORMING CYLINDRICAL SHAPES
Filed Aug. 28, 1963  6 Sheets-Sheet 1

INVENTORS
John L. Vaill
Frank W. Scann
BY
Rockwell and DeLio
ATTORNEYS

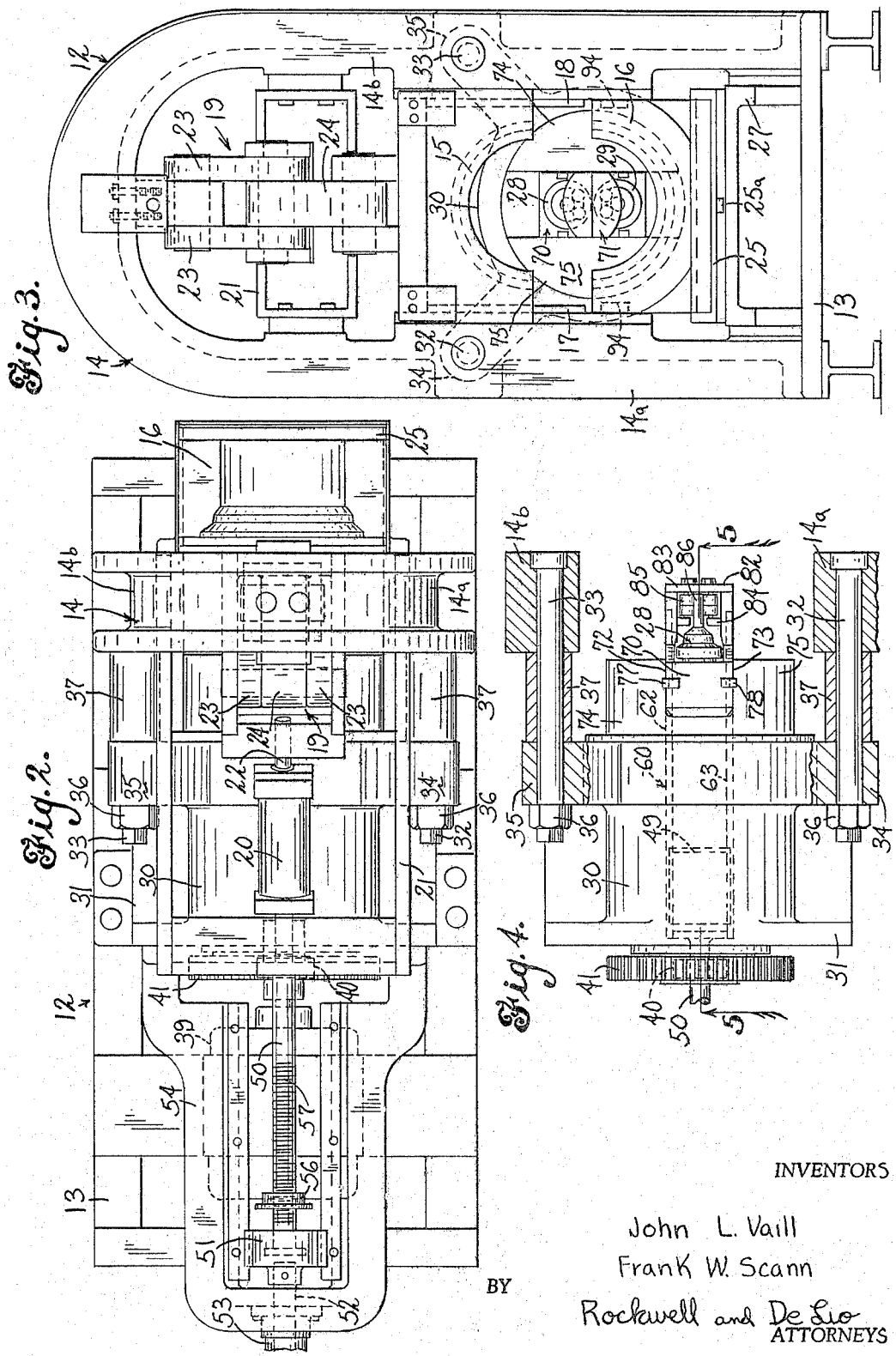

INVENTORS
John L. Vaill
Frank W. Scann
BY Rockwell and DeLio
ATTORNEYS

Dec. 13, 1966    J. L. VAILL ETAL    3,290,914
METHOD AND APPARATUS FOR FORMING CYLINDRICAL SHAPES
Filed Aug. 28, 1963    6 Sheets-Sheet 4

INVENTORS
John L. Vaill
Frank W. Scann
BY
Rockwell and DeLio
ATTORNEYS

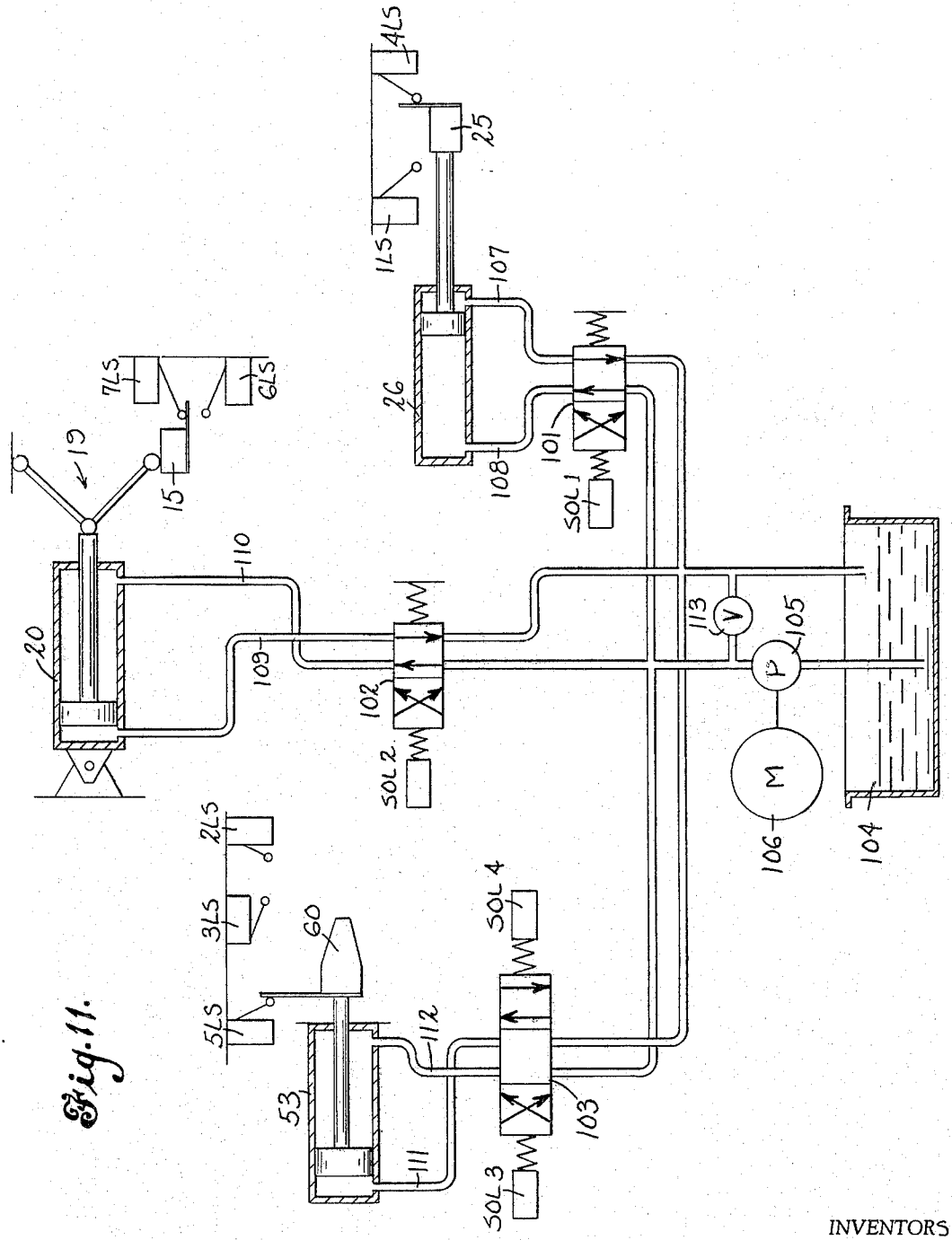

United States Patent Office 3,290,914
Patented Dec. 13, 1966

3,290,914
METHOD AND APPARATUS FOR FORMING
CYLINDRICAL SHAPES
John L. Vaill and Frank W. Scann, Waterbury, Conn.,
assignors to The Vaill Engineering Company, Waterbury, Conn.
Filed Aug. 28, 1963, Ser. No. 305,126
10 Claims. (Cl. 72—117)

This invention relates to the forming of shapes on tubular or cylindrical articles, and more particularly relates to a method and apparatus for forming shapes outwardly on the ends of or adjacent to the ends of cylinders or tubing.

Among the presently known techniques of forming and shaping or expanding the ends of cylindrical articles is a technique involving the rotation of mating rolls on the inner and outer periphery of the article to be shaped. This technique requires that the work must rotate between the rotating rolls and little, if any, control may be exercised over the finished diameter of the article. Another technique involves the use of an axial punch to expand and shape the end of a tube or cylinder. This punch-forming method has the disadvantage of requiring high axial pressures when relatively large cross-sectional areas are to be formed. In this technique the length of tubing or the cylinder must be clamped against axial movement while the forming punch engages the open edge of the tubing or cylinder. As the size of the tubing or cylinder increases, a correspondingly higher clamp pressure is required to retain the tubing in position upon impact of the axially movable punch. Another known method of shaping or expanding the edges of tubing or cylinder is by the use of an expandable member formed in segments which is inserted into the tubing or cylinder to be operated upon, and then the segments are forced radially outwardly to expand the edge of the tubing or cylinder. This last mentioned technique requires the use of very high pressures to upset and form the end of the tubing or cylinder and the severity of the forming and the attainment of more complicated formed shapes is limited in the segment-expanding technique.

In view of the limitations and deficiencies of the known prior art techniques of forming and shaping the end of a cylinder or length of tubing, the present invention provides a new and improved technique and apparatus for forming shapes outwardly on the ends of or adjacent to the ends of cylinders or tubing which may be relatively large size.

The present invention provides a technique of expanding and shaping the ends of cylinders or tubing wherein the tubing is maintained stationary, usually in a horizontal position, and the exterior periphery adjacent the end thereof is expanded. This expansion is accomplished by exerting oppositely directed forces on the inner peripheral surfaces of the article to be formed and imparting angular velocities to the members exerting the forces so that the force-producing members move both radially and angularly and generally trace a spiral path in expanding the article against the die seat.

In one form, the force-producing members are rotatable forming rolls shaped to cooperate with a stationary die member. A preferred apparatus for practicing the invention comprises forming rolls which move radially away from the center or axis of the article being formed and shaped, which forming rolls exert balanced, but oppositely directed radial pressure in a balanced manner on the article to be shaped, and further, work the article after forming to insure accurate shaping and a high degree of roundness.

Accordingly, an object of this invention is to provide a new and improved method and apparatus for forming expanded shapes outwardly on cylinders or tubing which may be of relatively large size.

Another object of this invention is to provide new and improved apparatus for forming shapes outwardly on the ends of or adjacent to the ends of cylinders or tubing wherein only radial balanced pressures are exerted on the cylinders or tubing.

A further object of this invention is to provide new and improved apparatus for expanding and shaping the ends of or portions adjacent the ends of cylinders or tubing which permits more severe forming of the cylinders or tubing and the attainment of more complicated shapes than are now possible by known prior art techniques.

A still further object of this invention is to provide new and improved apparatus for expanding and forming shapes outwardly on the ends of or adjacent to the ends of cylinders or tubing, which may be of relatively large size, and which provides closer tolerances and a higher degree of roundness than obtainable by presently known techniques.

A still further object of this invention is to provide new and improved apparatus for forming and shaping tubing or cylindrical articles employing forming members which exert equal and opposite forces on the internal surface of the article to be formed and simultaneously exert both radial and tangential forces on the article.

Briefly stated, the invention in one embodiment thereof comprises an apparatus which clamps a cylindrical object in a clamping block and stationary die arrangement. A forming member having rotatable forming rolls thereon shaped complementary to the die arrangement is axially positioned within the cylinder. The forming member comprises a plurality of forming rolls which move radially in roll carriers on the forming member. During the radial movement of the rolls the whole assembly of the forming member is rotated. The radial movement of the roll carriers with the rolls thereon is accomplished by a wedge-like member which is moved forward to expand the forming diameter of the forming rolls and moved backward to retract the position of the forming rolls. When the forming rolls reach their greatest radial distance of travel the rolls, together with the die arrangement, effectively comprise a forming die and the article is formed in accordance with the die contour. The forming rolls and forming member are allowed to continue to rotate or "dwell" to finally "iron out" the shape of the formed article and thus shape and work the formed article to a greater degree of roundness. At the conclusion of the ironing out phase the wedge is retracted which causes the forming rolls to retract to a starting position. Upon complete retraction of the forming rolls the die arrangement is opened and one segment thereof is extended to permit removal of the formed tube. The invention further comprises means for properly sequencing the forming apparatus to expedite operation thereof.

The features of the invention which are believed to be novel are pointed out with particularity and distinctly claimed in the concluding portion of this specification. However, the invention, as to its organization, operation and apparatus for its practice, together with further objects and advantages thereof may best be understood by reference to the following detailed description taken in conjunction with the drawings in which:

FIG. 2 is a plan view of the apparatus of FIG. 1;

FIG. 3 is an end elevation of the apparatus of FIG. 1 seen from the right side of FIG. 1;

FIG. 4 is a view, partly in section, seen along line 4—4 of FIG. 1 and illustrating the rotatable forming portion of the apparatus;

FIG. 11 illustrates schematically the hydraulic system of the apparatus of FIGS. 1 through 9.

Figure 1:
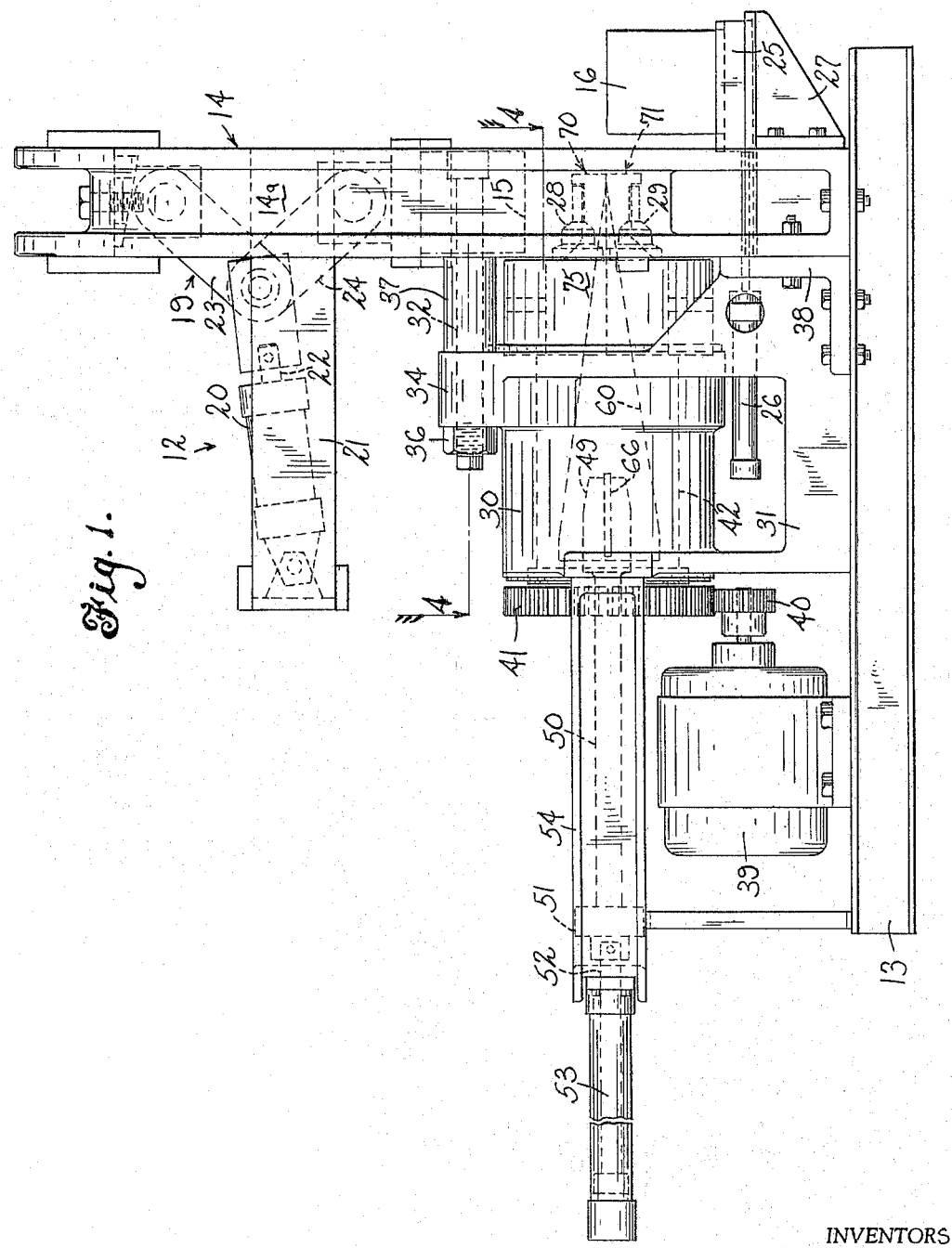
FIG. 1 is a side elevation of apparatus embodying the invention.

A preferred apparatus for practicing the invention and also incorporating the invention comprises a machine generally indicated by the reference number 12 which comprises a platform or foundation member 13, illustrated as a pair of spaced apart beams which support thereon an upright yoke-like frame member 14 having spaced apart parallel arms 14a and 14b. Frame 14 is arranged to receive upper and lower die segments 15 and 16 therein. Upper die segment 15 is movable on frame arms 14a and 14b on guide rails or keys 17 and 18 provided on opposed surfaces of arms 14a and 14b. Upper die member 15 is vertically moved on rails 17 and 18 by a toggle mechanism 19 actuated by a hydraulic cylinder 20, hereinafter referred to as clamping cylinder, supported on a mounting member 21 extending from frame 14. As hydraulic fluid is delivered to cylinder 20, as hereinafter described, the piston rod 22 thereof will drive the levers 23 and 24 of the toggle linkage towards an aligned position and move upper die member 15 downwardly on guides 17 and 18 to register with lower die member 16.

Lower die member 16 is mounted on a movable platform or shuttle 25 actuated by a hydraulic cylinder 26, hereinafter referred to as a shuttle cylinder, which moves platform 25 outwardly of frame 14 on platform member 27 to receive a workpiece in die member 16 and also retracts platform 25 into the frame to align lower die member 16 with upper die member 15. Platform 25 is guided on platform member 27 by a key and keyway 25a.

Figure 9:
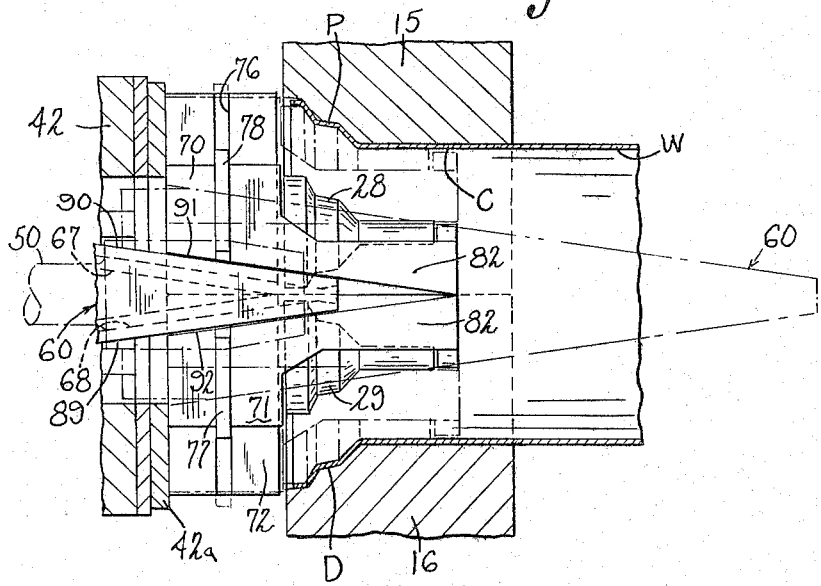
FIG. 9 is a fragmentary view partially in section illustrating the manner in which the forming apparatus of FIG. 4 functions in operating upon an article to be formed.

This arrangement facilitates the steps of placing a cylindrical object or workpiece W (FIG. 9) on lower die member 16 when it is extended from the frame 14, retracting lower die member 16 with the cylindrical workpiece W therein into the frame 14 and lowering of upper die member 15 into registration with lower die member 16 to clamp the workpiece W in the stationary die arrangement about the outer periphery of the workpiece. FIG. 9 illustrates the manner in which the initially tubular cylindrical workpiece W is formed and shaped at the edge or adjacent the end thereof in accordance with the provided contour or die seat on upper and lower die segments 15 and 16, when die segments 15 and 16 are brought into registration to form a stationary die arrangement. It may be noted from FIG. 9 that forming and shaping rolls 28 and 29 are provided which are contoured in accordance with and complementary to the die seat defined by upper and lower die segments 15 and 16, which during the forming and shaping operation comprise a stationary die member. The forming rolls 28 and 29 are carried on a rotatable forming member disposed within a housing 30 (FIGS. 1–4) which is mounted on or may be made integral with a mounting member 31 supported on frame 13. Housing 30 is aligned with the axis of the stationary die by means of pins 32 and 33 received in the legs of frame 14 and extending through ears 34 and 35 of frame 31. As most clearly seen in FIG. 4 the pins 32 and 33 are collared at one end thereof which collars are received in recesses provided therefor in the arms of frame 14. The opposite ends of the pins 32 and 33 are threaded and receive thereon securing nuts 36 to rigidly and securely space the forming member, more specifically the housing 30 thereof, and axially align the axis of the forming member within housing 30 with the axis of the stationary die. Bushing-like spacers 37 are provided between frame 14 and ears 34 and 35 about pins 32 and 33. Frame 31 is further secured, mounted and aligned with frame 14 by means of an L-shaped flange 38 secured to either arm of frame 14.

A forming member drive motor 39 is fixedly mounted to platform 13 and drives a pinion 40 in meshing engagement with a forming member drive gear 41.

Figure 7:
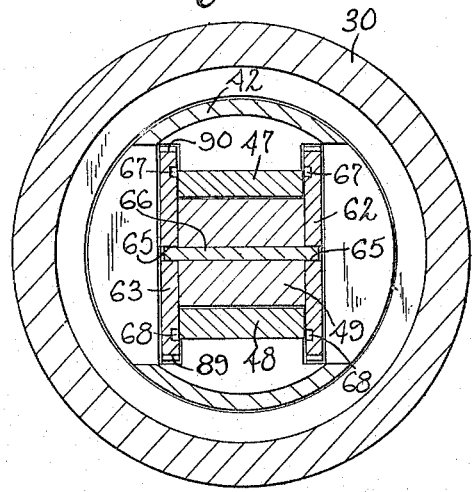
FIG. 7 is a view seen along section 7—7 of FIG. 5.
Figure 8:
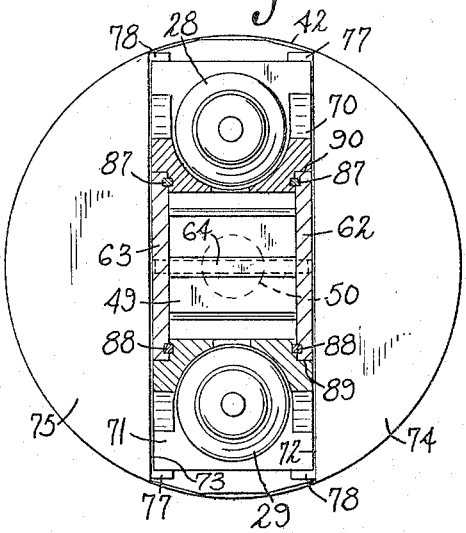
FIG. 8 is a view seen along section 8—8 of FIG. 5.

For a detailed description of the structure and operation of the rotatable forming member reference is now made to FIGS. 5 through 9. Gear 41 is secured to a rotatable forming member 42 through an adaptor member 43 having an aperture 44 centrally therethrough. Forming member 42 is rotatably mounted within housing 30 by means of bearing assemblies 45 and 46. Secured within forming member 42 are parallel spaced apart guides 47 and 48, providing parallel opposed surfaces between which may slide a guide block 49 on the end of a shaft 50 extending axially through aperture 44. Shaft 50 is connected through a rotary coupling 51 (FIGS. 1 and 2) to the piston rod 52 of a hydraulic cylinder 53 supported on a mounting bracket 54 extending from frame member 31. Cylinder 53 is hereinafter referred to as a work cylinder. Shaft 50 with block 49 thereon may therefore be guidably advanced or retracted between guide plates 47 and 48 upon actuation of work cylinder 53, while forming member 42 is rotated. Shaft 50 thus acts as a push-rod, connecting pistons 52 and guide block 49. It may be seen that shaft 50 extends through gear 41 and adapter 43 and rotates with forming member 42. Shaft 50 is threaded (FIG. 2) along a portion of the length thereof and threadably receives an adjusting member 56 thereon, adjustable along the length of threads 57 for purposes hereinafter described. Guide block 49 is secured to a wedge member 60 by means of a plurality of bolts 61. The wedge member 60 comprises spaced apart plate-like members 62 and 63 (FIGS. 7 and 8). Spacer means as exemplified at 64 may be provided between the spaced apart wedge plates forming the wedge to provide proper spacing therebetween and also rigidity of the wedge assembly. In the illustrated embodiment of the invention, the wedge plates are parallel. For additional strength, particularly when guide block 49 is advancing between guide plates 47 and 48 to move wedge 60 against the reaction of loading thereon, a keyway 65 (FIG. 5) is defined through the wedge members and block 49 to receive a key 66 therethrough which transmits the major portion of the force of push rod 50 to wedge 60 upon movement of shaft 50 and block 49 to advance wedge 60.

The function of wedge 60 is to equally move forming rolls 28 and 29 radially from the rotative axis of forming member 42. Each of the wedge members 62 and 63 have keyways 67 and 68 therein parallel to their inclined edges arranged to receive guide keys therein as hereinafter explained.

The forming rolls 28 and 29 are rotatably mounted in roll carriers 70 and 71, respectively, which are received between parallel guide surfaces 72 and 73 provided by roll carrier guide members 74 and 75, respectively. Roll carrier guide members 72 and 73 are mounted to an end of rotatable member 42 through an end plate 42a. Each of the surfaces 72 and 73 have keyways 76 defined therein parallel to each other which receive keys 77 and 78 carried by each of roll carriers 70 and 71. Therefore, the roll carriers 70 and 71 are movable along guiding surfaces 72 and 73 by means of the keys 77 and 78, respectively, in keyways 76.

Figure 5:
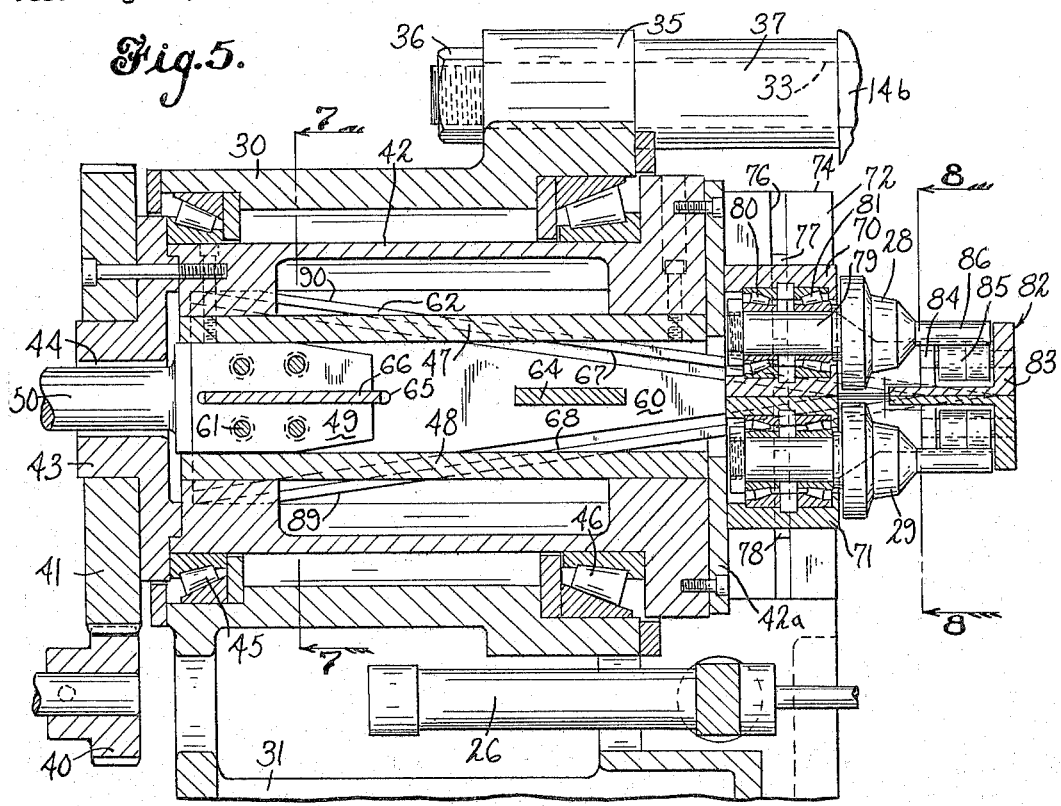
FIG. 5 is a section seen along line 5—5 of FIG. 4 illustrating in more detail the rotatable forming apparatus of FIG. 4.
Figure 6:
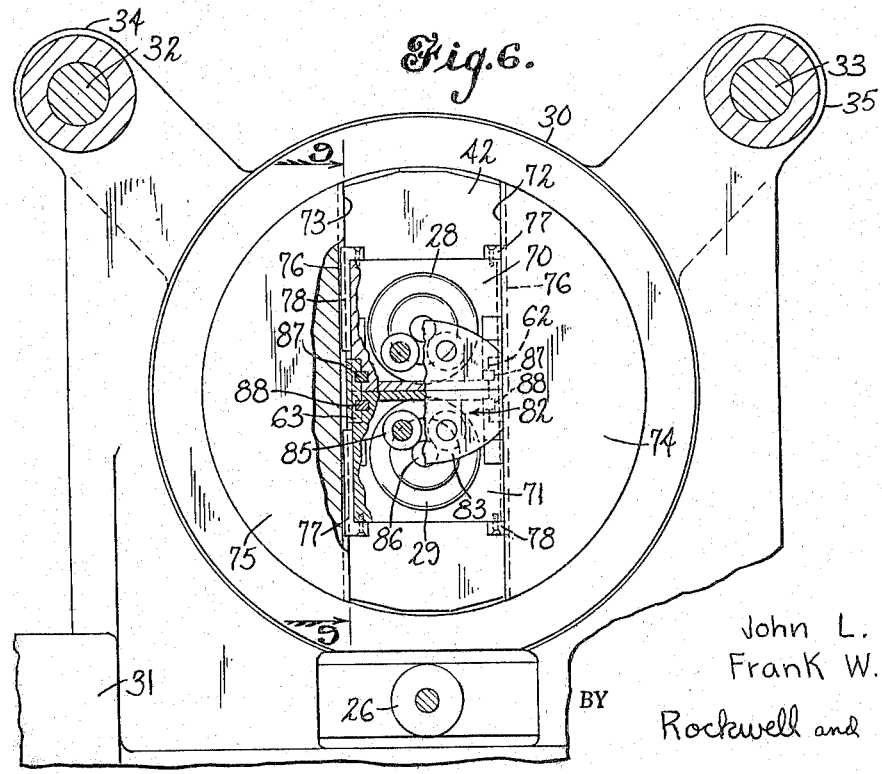
FIG. 6 is an enlarged end view, partly cut away, of the forming apparatus of FIG. 4 seen from the right side of FIG. 4.

Each of roll carriers 70 and 71 rotatably mount therein a journal 79 of a forming roll by means of bearing assemblies 80 and 81 (FIG. 5). Each of the roll carriers 70 and 71 is further provided with an extended portion 82 having spaced apart wall portions 83 and 84 which rotatably support back-up bearings 85 therebetween. Back-up bearings 85 engage the extending journal 86 of each of the forming rolls to prevent possible misalignment of forming rolls 28 and 29 when the shaping portion thereof is loaded. The back-up bearings 85 rotatably engage journal 86 of the forming rolls and act to produce a radially outwardly reactive force on journals 86 which opposes the reactive force exerted on forming rolls 28 and 29 as they are moved radially outwardly to form and to shape an article against the die seat provided by stationary die members 15 and 16.

Reference is now made to the keyways 67 and 68 in each of the wedge plates 62 and 63 (FIG. 7). The keyways 67 and 68 receive therein keys 87 and 88, respectively (FIGS. 6 and 8) which are carried by the roll carriers 70 and 71, respectively. The inclined surfaces 89 and 90 of wedge plates 62 and 63 are identically angled with respect to the axis of the forming member and the axis of the die arrangement. It may be seen that when rod 50 is advanced to advance block 49 between guides 47 and 48, wedge member 60 comprising the spaced apart wedge plates 62 and 63 will advance towards the roll carriers and in such advance will move the roll carriers radially outwardly as may be seen from a comparison of FIGS. 6 and 8. When the wedge 60 is retracted the connection of the wedge plates 62 and 63 to the roll carriers by virtue of the keys 87 will cause the roll carriers to move in radially toward the axis of the forming member regardless of the rotary position of the forming member.

FIG. 9 illustrates the manner in which wedge 60 advances to move the forming rolls 28 and 29 radially outwardly to mate with the die seat defined by die segments 15 and 16. The extended position of wedge 60, roll carriers 70 and 71, and forming rolls 28 and 29 are indicated in broken line. As wedge 60 advances, inclined surfaces 89 and 90 of each of wedge plates 62 and 63 move on mating-inclined surfaces 91 and 92 on roll carriers 70 and 71, respectively, and urge roll carriers 70 and 71 to move radially outwardly on surfaces 72 and 73 of the roll carrier guide members, carrying forming rolls 28 and 29 therewith into engagement with an end portion P of workpiece W. As forming rolls 28 and 29 move outwardly and forming member 42 is rotated, the forming rolls expand portion P against the die seat defined by die segments 15 and 16 and shape portion P to the contour of the die seat.

Inasmuch as the forming rolls 28 and 29 exert equal but opposite forces against the workpiece W as forming member 42 is rotated, the forming rolls iron out any irregularities in the formed position to produce a more accurate degree of roundness, and also work harden portion P to a degree which minimizes any tendency for portion P to spring back when the forming rolls are retracted.

It may be seen that the forming rolls produce equal but opposite radially directed forces on workpiece W, and also angular forces as forming member 42 is rotated. The force-producing members, the forming rolls, thus trace a spiral path.

The sequency of operation of the described machine is as follows: With platform 25 extended a workpiece W is placed thereon. Platform 25 with the workpiece W mounted in lower die section 16 is then retracted by shuttle cylinder 26 until lower die segment 16 is aligned with upper die segment 15 at which time the platform for the lower die thereon engages and is positioned by stopping blocks 94 (FIG. 3). Clamp cylinder 20 is then actuated to extend toggle linkage 19 and move upper die segment 15 downwardly into engagement with lower die segment 16 and clamp workpiece W in the stationary die around peripheral portion C thereof (FIG. 9). When work cylinder 53 is actuated, push rod 50 is moved forward in guides 47 and 48 by piston 52 of work cylinder 53. During this time drive motor 39 is rotating forming member 42. Push rod 50 causes wedge 60 to move outwardly towards the roll carriers, and move the roll carriers outwardly radially toward workpiece W. By virtue of the design of the wedge, the inclined surfaces being equally angled, the roll carriers 70 and 71 and hence the forming rolls 28 and 29 thereon move equal amounts. When the forming rolls are moved radially outwardly they are turning with rotatable member 42 and are thus rotating about the axis of the forming member at the time they engage the inner periphery of the workpiece. The forming rolls are thus moving in spiral paths and are expanding and rolling portion P of the workpiece outwardly into engagement with contoured die seat D of the stationary die arrangement. When the forming rolls have reached their maximum radial traverse, in accordance with the invention, they are preferably left in such a position for a predetermined length of time to dwell and iron out the formed and shaped portion of the workpiece W. After this ironing out phase, wedge 60 is retracted by work cylinder 53.

When wedge 60 is retracted the roll carriers are moved radially inwardly in a manner previously described, and when the wedge has been retracted a predetermined distance, as hereinafter described, clamp cylinder 20 is actuated to raise upper die segment 15 by means of the toggle linkage 19. Then platform 25 carrying lower die segment 16, and also the workpiece W, is extended as shown in FIG. 1 to permit removal of the workpiece. In the particular embodiment of the invention illustrated it may be noted that the workpiece W takes the form of an elongated cylindrical tubular article which is shaped at one end thereof. It will be understood that the die segments may be arranged to receive a cylindrical tubular article for forming a portion thereof intermediate the ends of the article. The die segments may also be arranged to receive an article for shaping both ends thereof symmetrically with respect to a vertical plane through the longitudinal axis of the die segments. In this last-mentioned arrangement identical die seats would be defined on both ends of the die segments.

Figure 10:
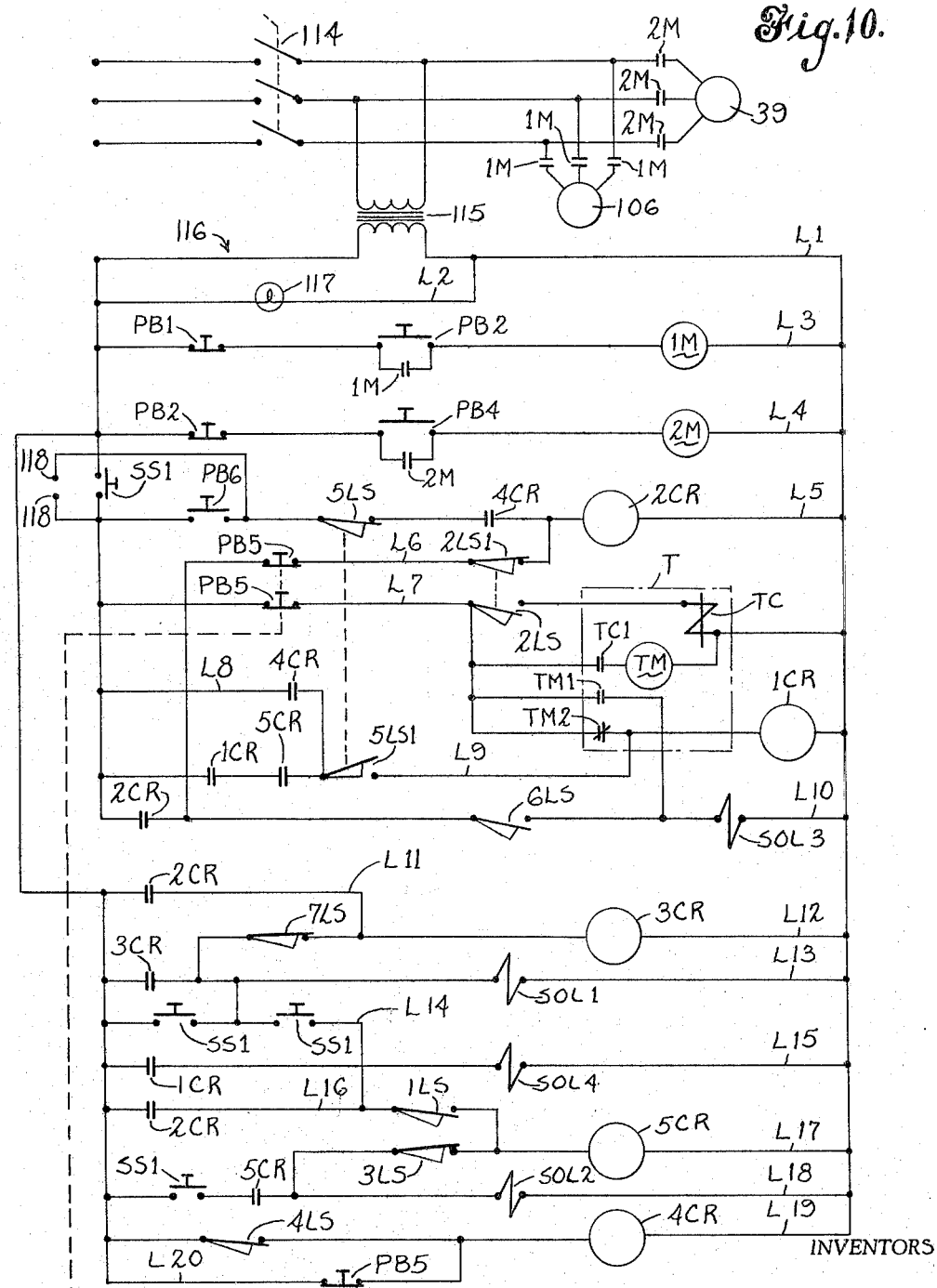
FIG. 10 is a schematic diagram of the electrical control circuit of the apparatus of FIGS. 1 through 9.

In accordance with the invention means are provided to automatically sequence the operation of the machine as described above. FIG. 10 illustrates in schematic form an electrical control circuit and FIG. 11 illustrates in schematic form a cooperating hydraulic control circuit. Referring first to FIG. 11 the hydraulic cylinders 20, 26 and 53 which actuate platform 25, toggle linkage 19 and wedge 60 are shown in diagrammatic form.

As shown, platform member 25 is arranged to actuate limit switches 1LS and 4LS at its opposite ends of travel. Limit switch 4LS will be closed when platform 25 is extended and opened when platform member 25 is retracted into frame 14, at which time limit switch 1LS is closed. Upper die segment 15 when in the raised position closes a limit switch 7LS. When in its lower or clamping position die segment 15 allows limit switch 7LS to open, and closes a limit switch 6LS. Wedge member 60 when in the retracted position holds closed a limit switch 5LS and upon reaching its fully extended position closes a limit switch 2LS which actuates a timing device as hereinafter described. Upon retraction, wedge member 60 closes limit switch 3LS. To summarize, when the apparatus is in a rest position with the platform 25 extended and upper die segment 15 raised limit switches 1LS, 2LS, 6LS and 3LS will not be depressed while limit switches 4LS, 5LS and 7LS will be depressed. Limit switch 3LS is only momentarily depressed as wedge 60 retracts.

The hydraulic cylinders 20, 26 and 53 are controlled by solenoid valves 101, 102 and 103, respectively. Solenoid valve 101 is a four-way valve arranged to selectively allow admittance of hydraulic fluid to shuttle cylinder 26 on either side of the piston therein and is operated upon energization of solenoid SOL1. Solenoid valve 102 is also a four-way valve arranged to selectively admit hydraulic fluid to clamp cylinder 20 on either side of the piston therein and thereby control the position of the piston. Solenoid valve 102 is operated by solenoid SOL2. Solenoid valve 103 is also a four-way valve arranged to control actuation of work cylinder 53. Hydraulic fluid may be supplied to the hydraulic cylinders through the associated solenoid valves from a reservoir 104 by means of a pump 105 driven by an electric motor 106.

Considering now solenoid valve 101, when solenoid SOL1 is energized hydraulic fluid will be admitted through the valve to conduit 107 to move platform 25 within frame 14. When solenoid SOL1 is not energized hydraulic fluid will be admitted to shuttle cylinder 26 through conduit 108 which positions and holds platform 25 at its extended position. When solenoid SOL2 is energized hydraulic fluid is admitted to clamp cylinder 20 through conduit 109 which moves the piston thereof outwardly to extend toggle linkage 19 and clamp die segment 16 on the workpiece. When solenoid SOL2 is not energized hydraulic fluid is admitted to clamp cylinder 20 through conduit 110 which retracts the piston thereof, shortening the toggle linkage 19 and raising upper die segment 15.

Solenoid valve 103 controls the admission of hydraulic fluid into work cylinder 53 over conduit 111 which advances the piston of cylinder 53 and therefore the wedge 60, or conduit 112 which causes the piston to retract and thereby retract wedge 60. Solenoid valve 103 is controlled by two solenoids SOL3 and SOL4. When solenoid SOL3 is energized upon lowering of upper die section 15 it allows solenoid valve 103 to admit hydraulic fluid into conduit 111 to advance the wedge 60. At the end of a forming operation solenoid SOL3 is de-energized and solenoid SOL4 is energized to allow admission of hydraulic fluid into conduit 112 into work cylinder 53 to retract wedge 60. Therefore, solenoid valve 103 is operated by two solenoids SOL3 and SOL4. Hydraulic fluid is at all times available for introduction into the hydraulic cylinders as selected by the solenoid valve inasmuch as pump motor 106 is continuously operating when the machine is in operation. A relief valve 113 is connected across the main pressure conduit and the main return line for obvious reasons.

The hydraulic system of FIG. 11 is only intended to functionally disclose the operation of the various elements of the apparatus and for that reason some elements of the hydraulic system, such as check valves, pressure-reducing valves, gages, etc., have not been shown. The use of such elements and the locations thereof will be known to those skilled in the art.

To commence operation of the apparatus the main line switch 114, FIG. 10, is closed to supply electric power to the motors and control circuits from an electric power source, not shown. This energizes transformer 115 to supply electric power to control circuits generally indicated at 116. When the switch PB2 is closed, relay 1M is energized causing its controlled contacts 1M to pick up, and allow pump motor 106 to be energized. In FIG. 10, unless otherwise specified, relays and the contacts controlled thereby are identified by the same reference numeral. In a similar manner when switch PB4 is closed, relay 2M is energized picking up its controlled contacts 2M and allowing drive motor 39 to be energized. The relays 1M and 2M are self-latching by provision of a contact controlled by each relay across the starting switches. Normally closed stop switches PB1 and PB3 may be provided in lines L3 and L4 to de-energize relays 1M and 2M if it should be necessary. A signal lamp 117 is provided in line L2 across the secondary of transformer 115 to visually indicate that the control circuits are energized.

A cycle of operation may be commenced by closing switch PB6 in line 5 and applying a momentary voltage to terminals 118. At this point limit switch 5LS in line L5 is closed but its ganged mate 5LS1 in line 9 is open, limit switch 4LS in line L19 is closed and limit switch 7LS in line L12 is opened. Therefore, relay 4CR is energized and its controlled contacts bearing the same designation are picked up. Thus, when PB6 is closed, relay 2CR is energized and latches itself through the closed 2LS1 switch in line L6 through its controlled contact 2CR in line L10. The ganged mate of 2LS1, 2LS is open at this time. When contact 2CR in line L11 closes, a circuit is provided through contact 3CR and solenoid SOL1, both in line L13, which energizes solenoid SOL1 and, as previously explained, shuttle cylinder 26 will retract platform 25 into frame 14. At this point limit switch 1LS, line L16, is closed and limit switch 4LS is opened. When limit switch 1LS is closed relay 5CR in line L17 is energized through closed contact 2CR and limit 1LS in line L16. When limit switch 1LS is closed it also provides a circuit path through solenoid SOL2 through the closed 5CR contact in line L18. Therefore, in a manner previously explained, when solenoid SOL2 is energized clamp cylinder 20 will be actuated to extend toggle linkage 19 and move upper die segment 15 downwardly into registration with lower die segment 16 and clamp a workpiece therebetween. When upper die segment 15 moves into registration with lower die segment, limit switch 6LS is closed in line L10 which provides a circuit through solenoid SOL3 in line L10. When solenoid SOL3 is energized, as previously explained, work cylinder 53 is actuated to move wedge 60 forward to radially move the forming rolls. When wedge 60 has moved forward and the workpiece has been formed in the die portions 15 and 16 it closes limit switch 2LS, line L7, which initiates a timing cycle for an "ironing out" phase to insure that the workpiece is properly and accurately formed. It may be noted that limit switch 2LS has two ganged portions, 2LS and 2LS1, one each in lines L7 and L6, respectively. When the wedge reaches its extended position it closes limit switch 2LS in line L7 and by the ganged arrangement opens limit switch 2LS1 in line L6, which de-energizes relay 2CR. When 2LS is closed timing clutch TC is energized, its contact TC1 is picked up to energize relay TM, which picks up its contact TM1 to energize solenoid SOL3 which would have been de-energized by relay 2CR being de-energized. When relay TM is energized its pick up contact TM1 and drops out contact TM2. As the timing clutch TC times out it drops out contact TC1 which de-energizes timing relay TM causing contact TM1 to drop out and contact TM2 to pick-up. When contact TM1 opens, solenoid SOL3 is de-energized, and relay 1CR is energized by closing of contact TM2. When relay 1CR is energized it picks up contact 1CR in line L15 allowing solenoid SOL4 to become energized. Solenoid SOL4 actuates solenoid valve 103 to allow the introduction of hydraulic fluid through conduit 112 to work cylinder 53 and thereby move wedge 60 towards a retracted position. As the wedge 60 is retracted it will momentarily open and close limit switch 3LS, line L17 and de-energize solenoid SOL2 which through solenoid valve 102 actuates clamping cylinder 20 to raise upper die segment 15, and release the workpiece.

When the upper die segment 15 has moved to the point where it closes limit switch 7LS, relay 3CR in line L12 is de-energized. When 3CR is de-energized its controlled contact in line 13 drops out de-energizing solenoid SOL1. This causes solenoid valve 101 to actuate shuttle cylinder 26 to move platform 25 carrying the lower die segment 16 outwardly of the frame and permit removal of the workpiece therefrom. When the platform 25 reaches its limit of extended travel it closes limit switch 4LS, line L19 to energize relay 4CR. When relay 4CR is energized it closes its controlled contact in line L8, which sets up a circuit through relay 1CR. When relay 1CR is energized it closes its controlled contact in line L15 which energizes solenoid SOL4. This causes the wedge to retract completely until 5LS, line L9, is depressed and 1CR is dropped out. Solenoid SOL4 is then de-energized. At this time the apparatus is back in a rest position and a new cycle of operation may then be initiated. The switches SS1 which are normally closed are provided for manual operation of the apparatus during tool set-up and will control operation of the shuttle cylinder and clamp cylinder individually. The apparatus will not cycle when switches SS1 are open for manual operation. Switches PB5 in lines L6, L7, and L20 may be opened for emergency return of wedge 60.

The above described control system lends versatility to the apparatus. The forming pressure exerted by the roll carriers may be varied by changing the operating pressure in the hydraulic system. The rate of forming can be varied by changing the transverse speed of the wedge through flow control of the hydraulic fluid to the wedge-actuating cylinder 53. The dwell time or the length of time utilized in ironing out the shape of the workpiece after the wedge has traversed its predetermined length of travel can be varied through presetting the timer. Moreover, the outward radial movement of the forming rolls may be controlled by limiting the forward stroke of the wedge. This may be accomplished by adjusting the position of adjusting member 56 on the threaded portion of push rod 50 to predetermine the forward travel of the wedge. The provision of the ironing out phase or the dwell time of the forming rollers after the forming rollers have reached their outermost travel is very important in that it permits the attainment of close tolerances and gives improved roundness of work. This ironing out phase also can be utilized to work-harden the metal of the workpiece to the extent that little or no spring back results when the forming rolls are radially retracted.

It will be understood that the die segments 15 and 16 may be replaced with other die segments and other forming rolls placed in the roll carriers for use with such other die segments. Moreover, the forming rolls or other forming elements might be radially actuated by a linkage similar to a toggle linkage, rather than by a wedge. Other types of operating mechanisms, and controls therefor, may be utilized within the scope of the invention to simultaneously radially move force-producing forming elements and impart angular velocities thereto.

It may be noted that the forming pressures are radially exerted on a workpiece as the forming rolls move radially outwardly and at the same time equal angular velocities are imparted to the forming forces exerted by the forming rolls. The forming rolls produce forming pressures which are always diametrically balanced, which in turn permit more severe forming and the attainment of more complicated formed shapes than are now known to be possible by other techniques.

While a preferred embodiment of the invention, together with preferred apparatus for its practice, for purposes of disclosure, have been illustrated and described, other embodiments of the invention as well as modifications to be disclosed embodiments thereof may occur to those skilled in the art. For example, apparatus embodying the invention may be constructed utilizing more than two forming elements which move radially along paths spaced equi-angularly. Such arrangement would still give the same balanced forming pressures, both radially and angularly. Also the die may be formed in multiple segments.

It may thus be seen that the objects set forth above, as well as those made apparent from the preceding description, are efficiently attained. Since modifications of the disclosed embodiment of the invention and other embodiments thereof may occur to those skilled in the art, it is intended in the appended claims to cover all embodiments and modifications of the invention which do not depart from the spirit and scope of the invention.

What is claimed is:

1. The method of shaping a portion of a cylindrical article radially outwardly against a circular die seat of a die comprising the steps of clamping a cylindrical article in the die with a portion thereof adjacent the die seat, guidably moving force-producing members radially outwardly from the center of the die to produce equal and opposite radially directed forces on the inner surface of the article adjacent the die seat, imparting equal angular velocities to the force-producing members while moving the force-producing members outwardly, and ceasing outward movement of said force-producing members after forming the portion and continuing rotation of said force-producing members for a period of time to work the portion against the die seat.

2. Forming apparatus comprising a die defining a circular die seat and arranged to receive and clamp a cylindrical article therein, a rotatable forming member comprising a plurality of rotatable forming rolls, said rolls having peripheral surfaces contoured complementary to the surface of said die seat, said forming rolls extending axially into said die seat, means for moving said rolls radially outwardly to engage an article in said die and exert radial forces thereon, and drive means independent of said means for moving for rotating said forming member.

3. Apparatus for forming a portion of a cylindrical article comprising a frame member, a die in said frame defining a circular die seat, a rotatable forming member, a plurality of roll carriers carried by said forming member, a forming roll rotatably mounted on each of said roll carriers, said forming rolls having peripheral surfaces contoured complementary to the internal surfaces of said die seat, said roll carriers being movable radially on said forming member to move said forming rolls toward registry with said die seat to form a portion of an article therebetween, a wedge-like member on said forming member guidably movable longitudinally thereof and extending between said roll carriers, means guidably interconnecting said wedge-like member and said roll carriers to produce radial movement of said roll carriers upon movement of said wedge-like member on said forming member, means for rotating said forming member, and means for moving said wedge-like member to cause said roll carriers to move radially outwardly and form an article against said die seat.

4. Apparatus for forming an end portion of a cylindrical article comprising a frame member, a first die segment movable on said frame in a first plane, a second die segment movable on said frame in a second plane transverse to the first plane, said die segments defining a die having a circular die seat, one of said die segments being extendable from said frame to receive an article therein and then retractable to said frame, the other of said die segments being movable into registry with said one of said segments to clamp an article in said die and define said circular die seat, a rotatable forming member, a plurality of roll carriers carried by said forming member, a forming roll rotatably mounted on each of said roll carriers, said foming rolls having peripheral surfaces contoured complementary to the internal surfaces of said die seat, said roll carriers being movable radially on said forming member to move said forming rolls toward registry with said die seat to form an end portion of an article therebetween and means for moving said roll carriers radially outwardly and form an article against said die seat.

5. The apparatus of claim 4 including control means for sequencing operation thereof, said control means comprising first signalling means to signal when said extendable die segment has been retracted into said frame, means responsive to the signal of said first signalling means to move the other of said die segments into registry with the retracted die segment and define said die seat, second signalling means for signalling when said die segments are in registration, and means responsive to the signal of said second signalling means for radially moving said roll carriers.

6. Apparatus for forming an end portion of a cylindrical article comprising a frame member, a first die segment movable on said frame in a first plane, a second die segment movable on said frame in a second plane transverse to the first plane, said die segments defining a die having a circular die seat, one of said die segments being extendable from said frame to receive an article therein and then retractable to said frame, the other of said die segments being movable into registry with said one of said segments to clamp an article in said die and define said circular die seat, a rotatable forming member, a plurality of roll carriers carried by said forming member, a forming roll rotatably mounted on each of said roll carriers, said forming rolls having peripheral surfaces contoured complementary to the internal surfaces of said die seat, said roll carriers being movable radially on said forming member to move said forming rolls toward registry with said die seat to form an end portion of an article therebetween, a wedge-like member on said forming member guidably movable longitudinally thereof and extending between said roll carriers, means guidably connecting said wedge-like member and said roll carriers to produce radial movement of said roll carriers upon movement of said wedge-like member on said forming members, means for rotating said forming member, means for moving said wedge-like member to cause said roll carriers to move radially outwardly and form an article against said die seat, means for signalling when said wedge-like member has advanced to a predetermined position to cause said forming rolls to form an article against said die seat to initiate timing means to maintain said wedge in said predetermined position for a predetermined period to allow said forming rolls to work an article against said die seat, said timing means being effective upon termination of said predetermined period to cause said wedge-like member to retract, means responsive to retraction of said wedge-like member for moving said other of said die segments to unclamp an article, and means responsive to movement of said other of said die segments for extending said one of said die segments to allow removal of a formed article.

7. Apparatus for forming a portion of a cylindrical article comprising a die defining a circular die seat and arranged to receive a cylindrical article therein with a portion of the article adjacent said die seat, a plurality of forming elements positionable within said die seat, means for moving said forming elements in a spiral path with respect to the axis of said die seat to engage and form the portion to the die seat, means for sensing when the article has been formed to the die seat, means responsive to said sensing means for halting the radial component of movement of said forming elements, and means for discontinuing angular movement of said forming elements after a predetermined interval of time subsequent to halting radial movement thereof.

8. Apparatus for forming a portion of a cylindrical article comprising a die defining a circular die seat and arranged to receive and hold a cylindrical article therein, a rotatable chuck member, a pair of guide members having spaced apart surfaces, a plurality of carrier members received between said guide members, said guide members and said carriers having guide means defined therebetween to permit radial movement of said carriers on said guides, a forming roll carried by each of said carriers, said forming rolls extending within said die seat, a carrier positioning member movable longitudinally within said chuck member substantially along the rotative axis thereof, said positioning member having means slidably interlocked with said carrier members so that the position of said positioning member determines the position of said carriers on said chuck, means for rotating said chuck, means for moving said positioning member.

9. Apparatus for forming a portion of a cylindrical article comprising a die defining a circular die seat and arranged to receive and hold a cylindrical article therein with at least a portion of the article adjacent said die seat, a rotatable chuck member, a plurality of carrier members on said chuck movable radially thereon, a forming roll carried by each of said carriers, said forming rolls extending within said die seat, a carrier positioning member movable longitudinally within said chuck member substantially along the rotative axis thereof, said positioning member having means slidably interlocked with said carrier members so that the position of said positioning member determines the radial position of said carriers on said chuck, means for rotating said chuck, and means for moving said positioning member as said chuck is rotated.

10. Apparatus for forming a portion of a cylindrical article comprising a die defining a circular die seat and arranged to receive and hold a cylindrical article therein with at least a portion of the article adjacent said die seat, a rotatable chuck member, a pair of guide members having spaced apart surfaces, a plurality of carrier members received between said guide members, said guide members and said carriers having guide means defined therebetween to permit linear motion of said carriers on said guides, a forming roll carried by each of said carriers, said forming rolls extending within said die seat, a carrier positioning member movable longitudinally within said chuck member substantially along the rotative axis thereof, said positioning member having means slidably interlocked with said carrier members so that the position of said positioning member determines the position of said carriers on said chuck, means for rotating said chuck, and means for positioning said positioning member as said chuck is rotated.

References Cited by the Examiner
UNITED STATES PATENTS

| | | | |
|---|---|---|---|
| 319,559 | 6/1885 | Cashin | 72—122 |
| 744,672 | 11/1903 | Baeumle | 72—122 |
| 800,764 | 10/1905 | Rigby | 72—117 |
| 1,004,492 | 9/1911 | Stock | 72—122 |
| 2,690,205 | 9/1954 | Stary | 72—123 |
| 2,835,309 | 5/1958 | Wallace | 72—123 |
| 2,933,124 | 4/1960 | Benson et al. | 72—117 |

CHARLES W. LANHAM, *Primary Examiner.*

RICHARD J. HERBST, *Examiner.*